US012605657B2

(12) United States Patent
Crooks et al.

(10) Patent No.: US 12,605,657 B2
(45) Date of Patent: Apr. 21, 2026

(54) FILTRATION SYSTEM WITH IMPROVED STANDPIPE DESIGN

(71) Applicant: Cummins Filtration Inc., Nashville, TN (US)

(72) Inventors: Joshua Crooks, Cookevile, TN (US); Zemin Jiang, Cookeville, TN (US); Sudhindra Palaxa Arakeri, Shahapur (IN)

(73) Assignee: Atmus Filtration Inc., Nashville, TN (US)

( * ) Notice: Subject to any disclaimer, the term of this patent is extended or adjusted under 35 U.S.C. 154(b) by 0 days.

(21) Appl. No.: 18/933,383

(22) Filed: Oct. 31, 2024

(65) Prior Publication Data

US 2025/0050249 A1      Feb. 13, 2025

Related U.S. Application Data

(63) Continuation of application No. PCT/US2023/020164, filed on Apr. 27, 2023.

(30) Foreign Application Priority Data

May 3, 2022      (IN) .............................. 202241025659

(51) Int. Cl.
B01D 29/21 (2006.01)

(52) U.S. Cl.
CPC ........ B01D 29/21 (2013.01); *B01D 2201/291* (2013.01); *B01D 2201/316* (2013.01); *B01D 2201/347* (2013.01)

(58) Field of Classification Search
CPC .............. B01D 29/21; B01D 2201/291; B01D 2201/316; B01D 2201/347

USPC .............. 210/438, 437, 279, 282, 305, 306, 210/440–444, 451, 455–457
See application file for complete search history.

(56) References Cited

U.S. PATENT DOCUMENTS

| | | | |
|---|---|---|---|
| 4,344,777 A | 8/1982 | Siposs | |
| 4,664,682 A | 5/1987 | Monzen et al. | |
| 5,753,120 A * | 5/1998 | Clausen ................. | B01D 35/30 |
| | | | 210/450 |
| 5,762,789 A | 6/1998 | De Los Reyes et al. | |

(Continued)

FOREIGN PATENT DOCUMENTS

| | | |
|---|---|---|
| DE | 27 16 176 A1 | 10/1978 |
| DE | 10 2019 115 797 A1 | 1/2020 |

(Continued)

OTHER PUBLICATIONS

PCT International Search Report and Written Opinion issued Jul. 25, 2023 for PCT Application No. PCT/US2023/020164.

(Continued)

*Primary Examiner* — Madeline Gonzalez
(74) *Attorney, Agent, or Firm* — Foley & Lardner LLP

(57)      ABSTRACT

A filtration system for filtering a fluid is described herein. The filtration system includes a filter element. The filter element includes a filter media that is structured to filter a fluid. The filter element also includes a first endplate, a second endplate, and a standpipe positioned radially within the filter media and coupled to the second endplate. The standpipe includes a first portion having a cylindrical shape and a second portion having a conical shape, the second portion downstream of the first portion.

5 Claims, 7 Drawing Sheets

(56)     References Cited

U.S. PATENT DOCUMENTS

| | | | |
|---|---|---|---|
| 8,465,643 | B2 | 6/2013 | Beard et al. |
| 8,764,984 | B2 | 7/2014 | Curt et al. |
| 8,991,619 | B2 | 3/2015 | Schweitzer |
| 9,011,685 | B2 | 4/2015 | Holker et al. |
| 2009/0308803 | A1* | 12/2009 | Beard .................. B01D 36/006 |
| | | | 210/313 |
| 2010/0294707 | A1 | 11/2010 | Abdalla et al. |
| 2011/0147297 | A1 | 6/2011 | Core et al. |
| 2014/0305858 | A1 | 10/2014 | Downs et al. |
| 2017/0080362 | A1 | 3/2017 | Ries et al. |
| 2017/0087490 | A1 | 3/2017 | Eberle et al. |
| 2019/0217229 | A1 | 7/2019 | Rookey et al. |
| 2020/0384395 | A1 | 12/2020 | Ouweleen et al. |
| 2021/0086115 | A1 | 3/2021 | Hou et al. |
| 2021/0138365 | A1 | 5/2021 | Girondi |

FOREIGN PATENT DOCUMENTS

| | | | |
|---|---|---|---|
| EP | 2 789 375 | A1 | 10/2014 |
| WO | WO-2018/136047 | A1 | 7/2018 |

OTHER PUBLICATIONS

Extended Search Report issued for European Patent Application No. 23799843.0 issued Sep. 15, 2025, 9 pages.

* cited by examiner

FILTRATION SYSTEM WITH IMPROVED STANDPIPE DESIGN

CROSS-REFERENCE TO RELATED PATENT APPLICATIONS

This application is a continuation of PCT Patent Application No. PCT/US2023/020164, filed Apr. 27, 2023, which claims the benefit of India Provisional Application No. 202241025659, filed May 3, 2022, entitled "FILTRATION SYSTEM WITH IMPROVED STANDPIPE DESIGN." The contents of these applications are incorporated herein by reference in their entirety.

FIELD

The present application relates generally to filtration systems for use in supplying filtered fluids to downstream devices.

BACKGROUND

Filtration systems may be used to separate contaminants from a fluid to protect downstream devices from damage (e.g., corrosion, clogging, etc.). For example, filtration systems may protect downstream devices by including filter elements to separate contaminants from the fluid that may damage the downstream devices. In some filtration systems, the fluid may have a higher temperature than the components of the filtration system, causing the components of the filtration system to increase in temperature. The increase in temperature may impact the tolerance of the filtration system components.

SUMMARY

One embodiment relates to a filter element. The filter element includes a filter media that is structured to filter a fluid. The filter element also includes a first endplate coupled to the filter media at a filter media first end, a second endplate coupled to the filter media at a filter media second end, opposite the filter media first end, and a standpipe positioned radially within the filter media and coupled to the second endplate. The standpipe includes a first portion and a second portion. The first portion extends away from the first endplate in a direction towards the second endplate. The first portion has a cylindrical shape. The second portion extends away from the first portion towards the second endplate. The second portion includes a radius that increases from a minimum radius at a second portion first end to a maximum radius at a second portion second end.

Another embodiment relates to a filtration system. The filtration system includes a filter head and a filter cartridge. The filter head includes a first port and a second port. The filter cartridge includes a shell coupled to the filter head and a filter element disposed within the shell. The filter element includes a filter media structured to filter a fluid, a first endplate coupled to the filter media at a filter media first end, a second endplate coupled to the filter media at a filter media second end, and a standpipe positioned radially within the filter media and coupled to the second endplate. The standpipe includes a first portion and a second portion. The first portion extends away from the first endplate in a direction towards the second endplate. The first portion has a cylindrical shape. The second portion extends away from the first portion towards the second endplate. The second portion has a radius that increases from a minimum radius at a second portion first end to a maximum radius at a second portion second end.

Another embodiment relates to a filter cartridge. The filter cartridge includes a shell and a filter element disposed within the shell. The filter element includes a filter media structured to filter a fluid, a first endplate coupled to the filter media at a filter media first end, a a second endplate coupled to the filter media at a filter media second end, opposite the filter media first end, and a standpipe positioned radially within the filter media and coupled to the second endplate. The standpipe includes a first portion and a second portion. The first portion extends away from the first endplate in a direction towards the second endplate. The first portion has a cylindrical shape. The second portion extends away from the first portion towards the second endplate. The second portion has a radius that increases from a minimum radius at a second portion first end to a maximum radius at a second portion second end.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the Figures generally, various embodiments disclosed herein relate to a filtration system. The filtration system advantageously includes an improved standpipe that may reduce fluid pressure and the impact of fluid temperature on components of the filtration system. The embodiments shown and described in further detail herein relate to an inside-out flow design for a filtration system. It should be understood that the embodiments described herein may be utilized in other filtration system arrangements. For example, the embodiments described herein may be utilized in an outside-in flow design and/or any other type of filtration systems. Additionally, the filtration system may include more or fewer components than as shown in the Figures. Accordingly, references to various components being within, downstream, exterior, upstream, and the like are relative to the embodiments shown in Figures, and it should be understood that other embodiments, such as an outside-in flow design for a filtration system, may have the same or similar components provided in a different arrangement.

Figure 1:
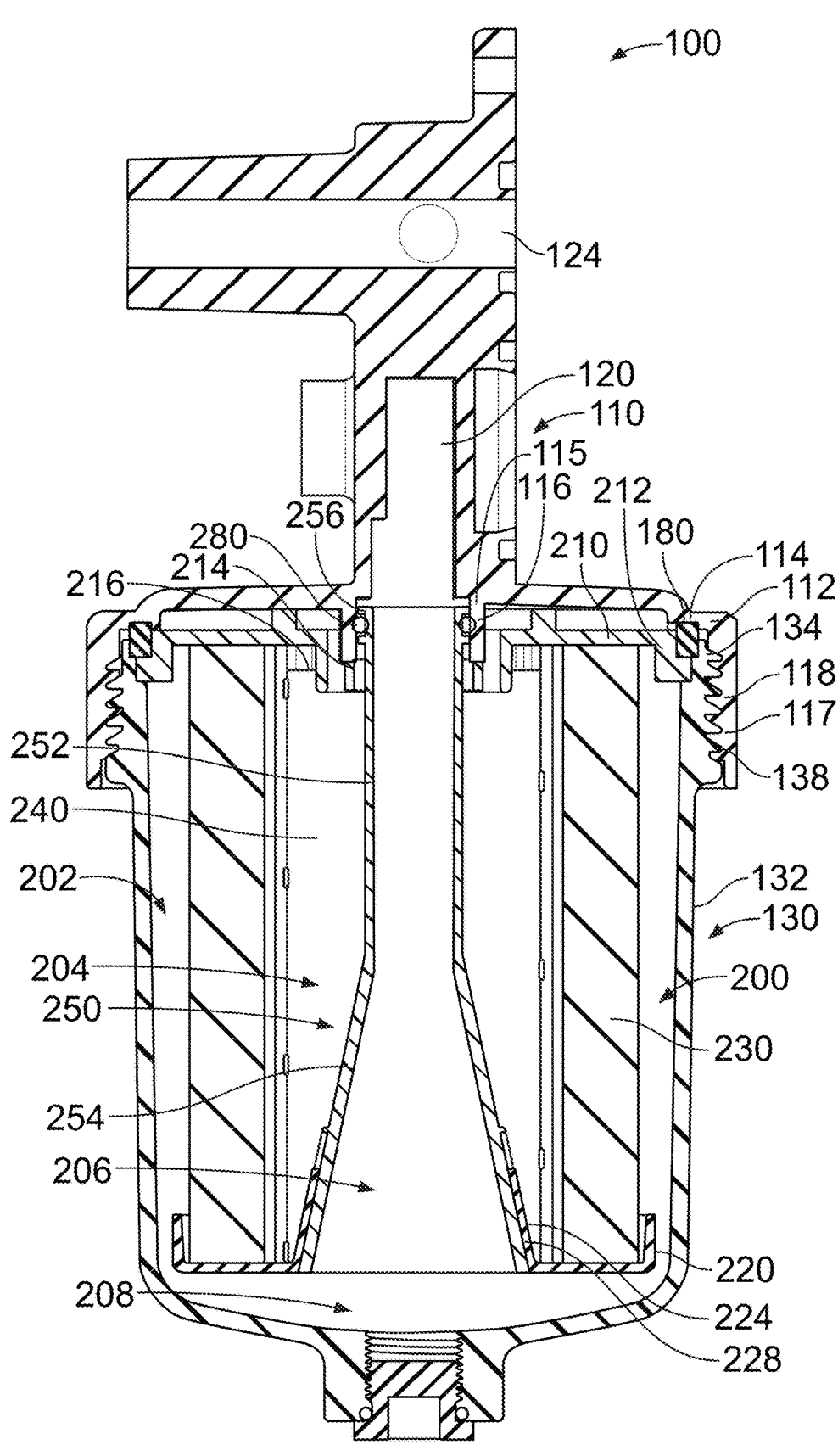
FIG. 1 is a side sectional view showing a filtration system, according to an example embodiment.

Now referring to FIG. 1, a side sectional view of a filtration system 100 is shown, according to an example embodiment. The filtration system 100 is configured to receive an unfiltered fluid (e.g., fuel, oil, etc.), filter the fluid, and provide the filtered fluid to a downstream device, such as an engine. As shown, the filtration system 100 includes a filter head 110 and a filter cartridge 130. It should be understood that the filtration system 100 may include more or fewer components than as shown in FIG. 1.

The filter head 110 includes a filter head body 112 that defines a first port 120 and a second port 124. The first port 120 is an inlet port in fluid receiving communication with an upstream device and in fluid providing communication with an interior of the filtration system 100. The second port 124 is an outlet port in fluid receiving communication with an interior of the filtration system 100 and in fluid providing communication with a downstream device, such as an engine. In some embodiments, the first port 120 may be an outlet port and the second port 124 may be an inlet port.

The filter head 110 includes a first filter head sealing surface 114. The first filter head sealing surface 114 is defined on a bottom surface of the filter head body 112. The first filter head sealing surface 114 is disposed at or directed towards the filter cartridge 130.

The filter head 110 includes an annular flange 115. The annular flange 115 extends axially away from the filter head body 112 and towards the filter cartridge 130. The annular flange 115 is substantially hollow such that the annular flange receives a portion of the filter cartridge 130.

The filter head 110 includes a second filter head sealing surface 116. The second filter head sealing surface 116 is defined on an inside surface of the annular flange 115. The second filter head sealing surface 116 directed inwards towards a portion of the filter cartridge 130 that is received by the annular flange 115.

The filter head 110 includes an outer wall 117. The outer wall 117 extends around an outer periphery of the filter head body 112 and axially away from the filter head body towards the filter cartridge 130.

The filter head 110 includes one or more filter head threads 118. The filter head threads 118 are disposed on an inside surface of the outer wall 117. The filter head threads 118 enable coupling the filter head 110 to the filter cartridge 130. As shown in FIG. 1, the filter head threads 118 are inward facing threads (e.g., female threads). It should be understood that, in other embodiments, the filter head 110 may have a different design or configuration than as shown in FIG. 1.

The filter cartridge 130 includes a shell 132 and a filter element 200. The filter element 200 is configured to filter the fluid (e.g., by removing contaminants). In some embodiments, the filter element 200 is removably coupled to the shell 132. In other embodiments, the filter element 200 is permanently secured within the shell 132 such that the filter element 200 cannot be removed from the shell 132 without causing damage to the filter element 200 and/or the shell 132. The filter element 200 is at least partially contained within the shell 132 and/or the filter head 110.

The shell 132 includes a shell sealing surface 134. The shell sealing surface 134 is disposed at a first end of the shell 132 and directed towards the filter head 110.

Figures 7A, 7B:
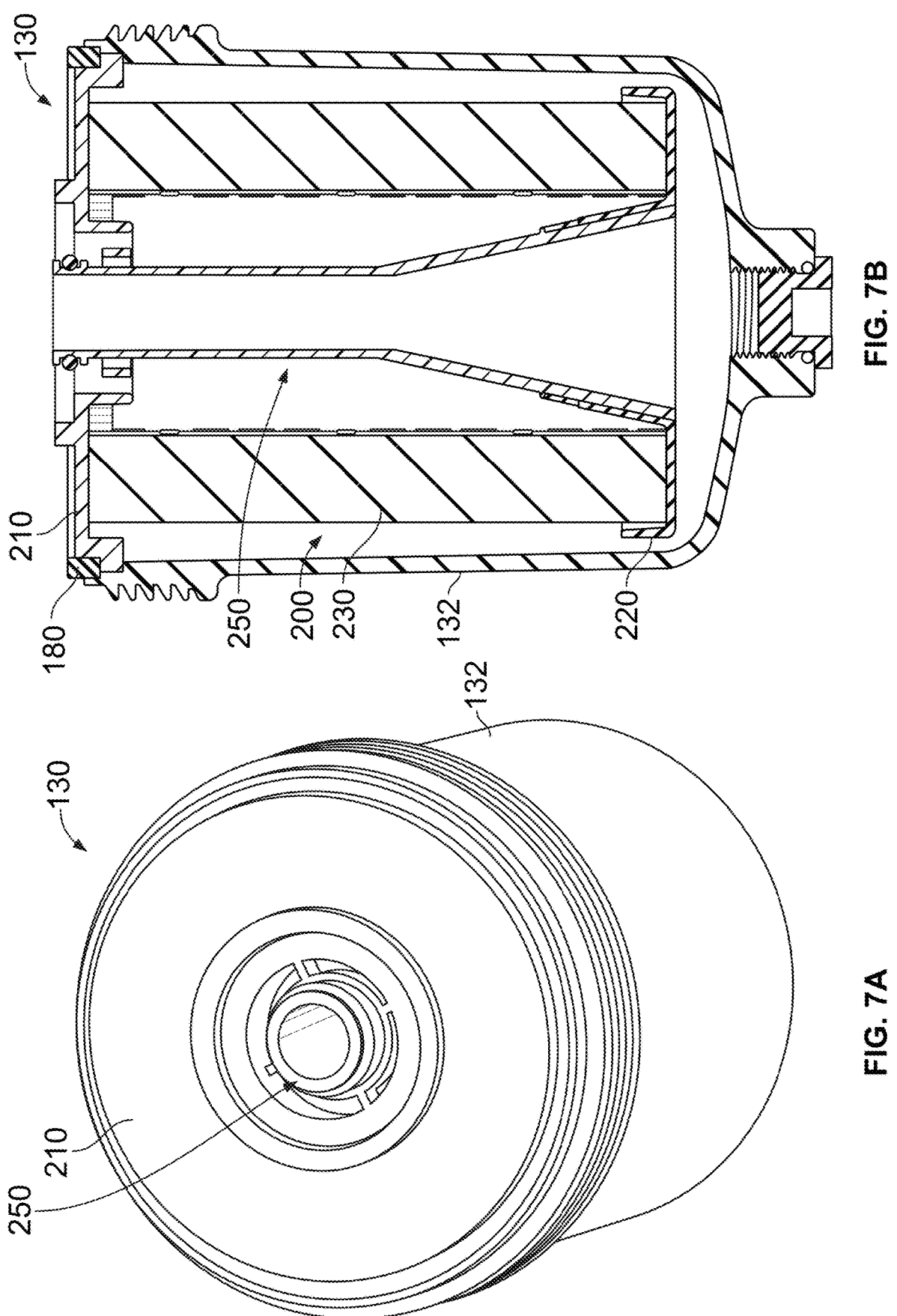
FIG. 7A is a perspective view of a filter cartridge for the filtration system of FIG. 1.
FIG. 7B is a sectional view of the filter cartridge of FIG. 7A.

The shell 132 includes one or more shell threads 138. The shell threads 138 are disposed at the first end of the shell 132 and on an outer surface of the shell 132. The shell threads 138 enable coupling the filter cartridge 130 to the filter head 110. As shown in FIG. 1, the shell threads 138 are outward facing threads (e.g., male threads) that are received by the inward facing filter head threads 118. Additional views of the filter cartridge 130 are shown in FIGS. 7A and 7B. In particular, FIG. 7A is a perspective view of a filter cartridge 130 for the filtration system 100 of FIG. 1, and FIG. 7B is a sectional view of the filter cartridge 130 of FIG. 7A.

Figures 6A, 6B:
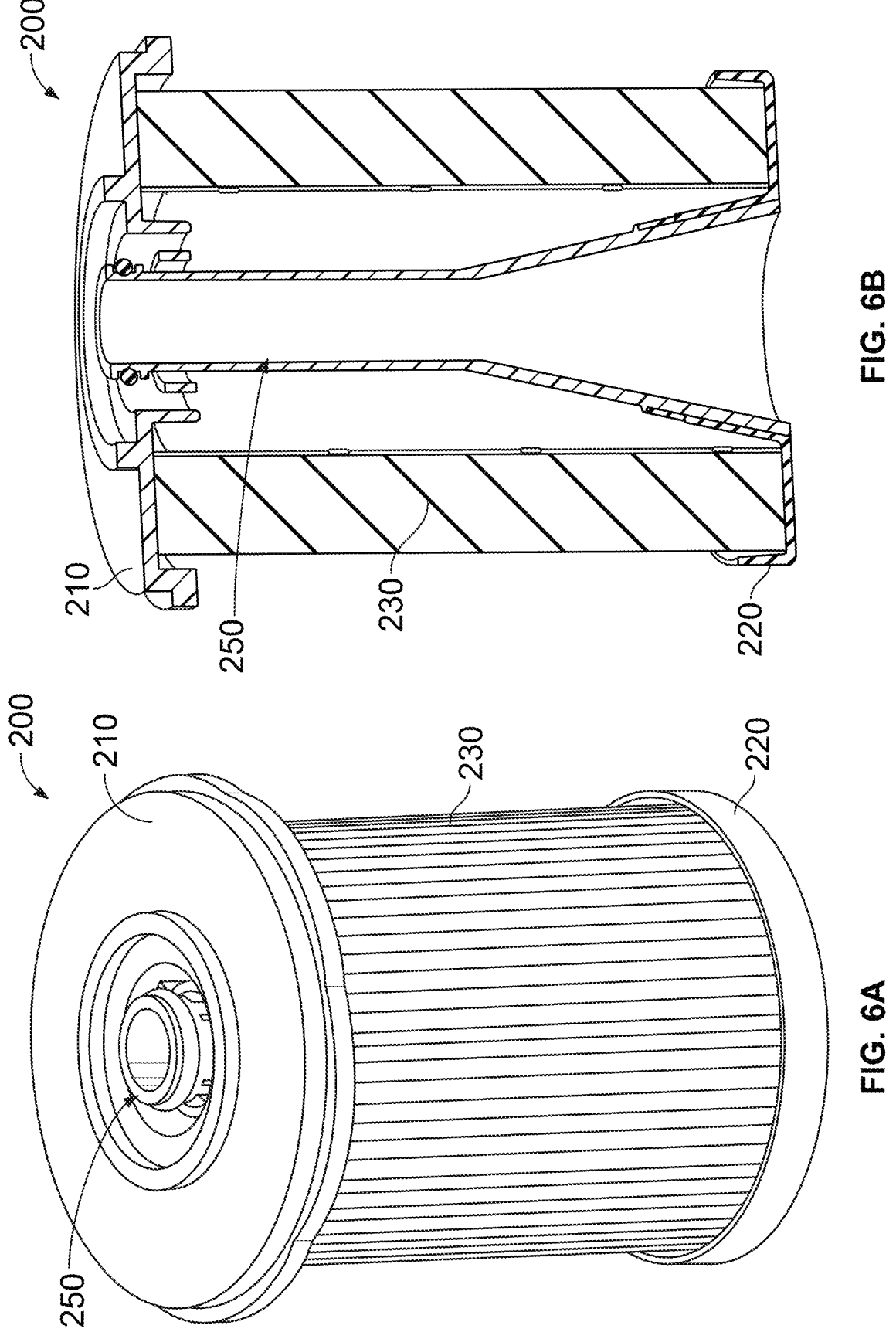
FIG. 6A is a perspective view of a filter element for the filtration system of FIG. 1.
FIG. 6B is a sectional view of the filter element of FIG. 6A.

As shown, the filter element 200 includes a first endplate 210, a second endplate 220, a filter media 230, a center tube 240, and a standpipe 250. The filter element 200 is also shown to include a first sealing member 180 (e.g., an O-ring, a gasket, etc.) and a second sealing member 280. Additional views of the filter element are shown in FIGS. 6A and 6B. In particular, FIG. 6A is a perspective view of a filter element 200 for the filtration system 100 of FIG. 1, and FIG. 6B is a sectional view of the filter element 200 of FIG. 6A.

The filter media 230 is positioned between and is coupled to the first endplate 210 and the second endplate 220. The filter media 230 is formed in a cylindrical or annular configuration. The filter media 230 may be pleated to increase surface area. The filter media 230 may be a single-layer media or a multi-layer media made from at least one of a woven fiber, a non-woven material, a wet laid material, a polymeric material, a glass material, a cellulose material, and/or other suitable material. The filter media 230 is structured to allow the unfiltered fluid to be filtered by flowing through the filter media 230. For example, the unfiltered fluid flows through the filter media 230, and the filter media 230 removes impurities, such as particulates, organic matter, and the like, from the unfiltered fluid as the unfiltered fluid passes through the filter media 230. The impurities are trapped by the filter media 230. An outer volume 202 is defined between the filter media 230 and the shell 132.

The first endplate 210 is fixedly coupled to the filter media 230. More specifically, the first endplate 210 is coupled to the filter media 230 at a filter media first end. The first endplate 210 includes a first endplate sealing surface 212. The first endplate sealing surface 212 supports the first sealing member 180. The first endplate sealing surface 212 is disposed at an outer periphery of the first endplate 210 and is directed towards the filter head 110 and the shell 132. More specifically, the first endplate sealing surface 212 is disposed proximate the shell sealing surface 134 and the first filter head sealing surface 114. The first filter head sealing surface 114, the shell sealing surface 134, and/or the first endplate sealing surface 212 define a cavity that is sized to receive the first sealing member 180. The first sealing member 180 presses against the first filter head sealing surface 114 and the shell sealing surface 134 forming a seal therebetween. The seal substantially prevents a fluid from flowing between the filter head 110 and the shell 132.

The first endplate 210 includes a first opening 214. The first opening 214 is sized to receive at least a portion of the standpipe 250 therethrough. The first opening 214 is substantially aligned with the annular flange 115 such that the standpipe 250 is received by the first opening 214 and the annular flange 115.

The first endplate 210 includes a second opening 216. The first opening 214 is positioned radially inside the second opening 216. The second opening 216 fluidly couples an interior of the filter element 200 with the second port 124. More specifically, the second opening 216 is in fluid receiving communication with an interior of the filter element 200 (e.g., the intermediate volume 204, described below) and in a fluid providing communication with the second port 124.

The second endplate 220 is fixedly coupled to the filter media 230. More specifically, the second endplate 220 is coupled to the filter media 230 at a filter media second end, opposite the first end. In the depicted embodiment, the second endplate 220 includes an inner portion 224. The inner portion 224 includes a substantially conical wall that extends axially away from the second endplate 220 towards the first endplate 210. The inner portion 224 defines an opening 228 that is sized to receive at least a portion of the standpipe 250. As described in greater detail with respect to FIGS. 4B and 4C, in various embodiments, the inner portion 224 includes a snap fit feature that couples the second endplate 220 to the standpipe 250 in a snap-fit arrangement.

The center tube 240 is positioned within the filter media 230. The center tube 240 is a hollow tube that defines an intermediate volume 204 between the center tube 240 and the standpipe 250. The center tube 240 includes one or more holes through a wall of center tube 240 that allow the fluid to pass through. In some embodiments, the center tube 240 is fixedly coupled to the first endplate 210, the second endplate 220, and/or the filter media 230. In other embodiments, the center tube 230 is positioned within the filter media 230 without coupling to the filter media 230. In these embodiments, the center tube 240 may contact the filter media 230 during operation. For example, the filter media 230 may flex or deflect inwards, towards the center tube 240 and the filter media 230. In some embodiments, the center tube 240 is retained between the first endplate 210 and the second endplate 220 with or without coupling to the first endplate 210 and/or the second endplate 220.

The standpipe 250 is positioned within the center tube 240. The standpipe 250 is a hollow tube having a first portion 252 and a second portion 254. The standpipe 250 defines an inner volume 206 for the fluid to pass therethrough. As briefly described above, the standpipe 250 may be coupled to the second endplate 220 in a snap-fit arrangement. In other embodiments, the standpipe 250 may be injection molded with one or both of the first endplate 210 and the second endplate 220.

The first portion 252 of the standpipe 250 comprises a substantially cylindrical tube. The first portion 252 extends from the first endplate 210 in a direction towards the second endplate 220, and more particularly, towards the second portion 254. The first portion 252 is in fluid receiving communication with the first port 120 and in fluid providing communication with the second portion 254.

The first portion 252 includes a standpipe sealing surface 256 at a first end (e.g., an upstream end). As shown in FIG. 1, the first end of the first portion 252 extends towards the first port 120. The standpipe sealing surface 256 is disposed around an outer surface of the standpipe 250. More specifically, the standpipe sealing surface 256 is a radially outward facing channel that is sized to receive the second sealing member 280. The second filter head sealing surface 116 is positioned radially within the annular flange 115 such that the standpipe sealing surface is substantially aligned with the second filter head sealing surface 116 and the standpipe sealing surface 256 and the second filter head sealing surface 116 cooperate to form a cavity for the second sealing member 280. The second sealing member 280 forms a radial seal between the standpipe sealing surface 256 and the second filter head sealing surface 116 such that the fluid is substantially prevented from flowing between the filter head 110 and an exterior of the standpipe 250.

The second portion 254 of the standpipe 250 comprises a tube that extends axially away from a second end (e.g., a downstream end) of the first portion 252 towards the second endplate 220. The tube of the second portion 254 includes a minimum radius and a maximum radius that is larger than the minimum radius. In various embodiments, the tube of the second portion 254 has a geometrically conical shape (e.g., a frusto-conical shape). In other embodiments the tube is not conical but nonetheless has an increasing radius along an axial length thereof. As shown in FIGS. 1, 6B, and 7B, the minimum radius of the second portion 254 is located at a first end (e.g., an upstream end) of the second portion 254 and the maximum radius is located at a second end (e.g., an downstream end) of the second portion 254, opposite the first end. In particular, at the first end of the second portion 254, the second portion 254 has a minimum radius that is substantially the same radius as the first portion 252. As the second portion extends away from the first portion 252, the radius of the second portion increases to the maximum diameter at the second end, proximate the second endplate 220. As shown in FIGS. 1, 6B, and 7B, the radius of the second portion 254 increases at a constant rate forming a frusto-conical shape. It should be understood that, in various embodiments, the radius of the second portion 254 may increase non-linearly. The second end (e.g., a downstream end) of the second portion 254 is substantially aligned with the second endplate 220. As described herein with respect to FIGS. 4B and 4C, the second portion 254 is coupled to the second endplate 220. The second portion 254 is substantially hollow such that the second portion 254 is in fluid receiving communication with the first portion 252 and fluid providing communication with a lower volume 208 that is defined between the second endplate 220 and the shell 132.

Figure 2B:
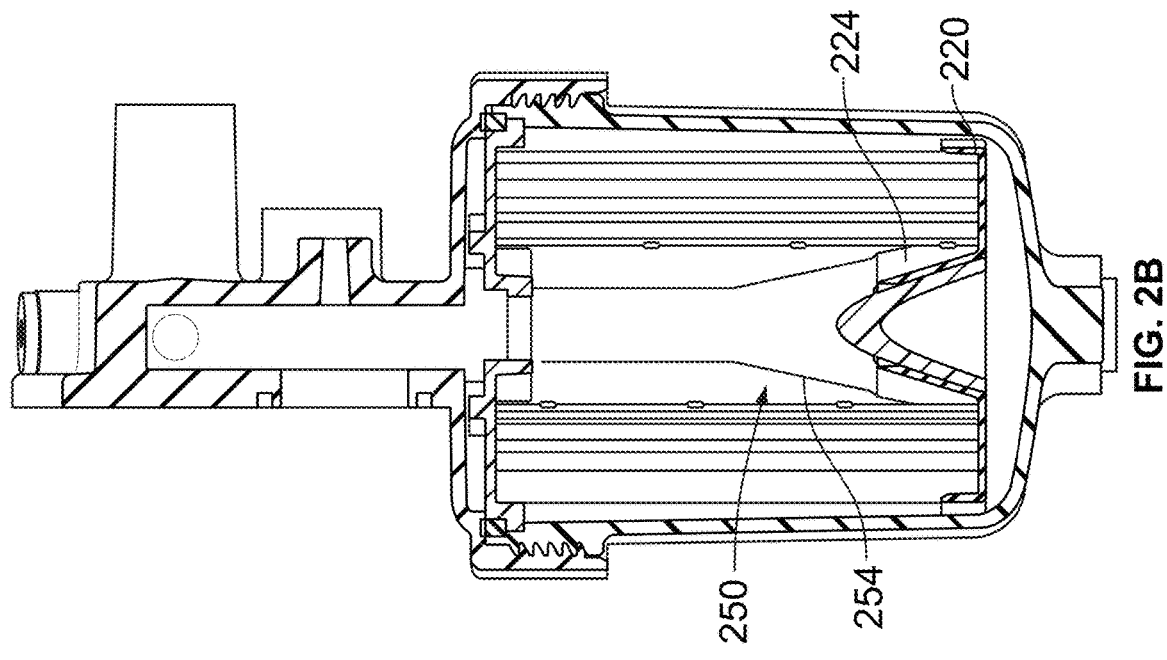
FIG. 2B is a side sectional view showing aspects of the filtration system of FIG. 1.
Figure 2A:
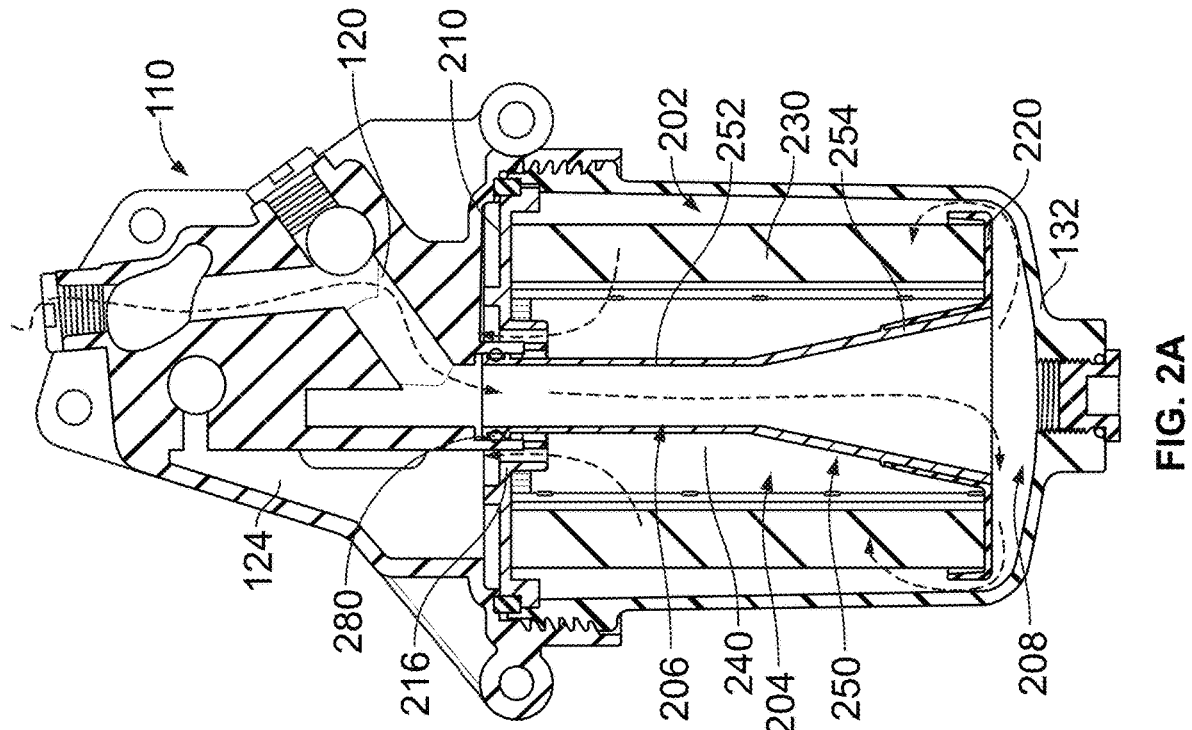
FIG. 2A is a side sectional view showing aspects of the filtration system of FIG. 1.

FIG. 2A is a side sectional view showing aspects of the filtration system 100 of FIG. 1. More specifically, FIG. 2A depicts a flow path for a fluid passing through the filtration system 100, represented by the dashed arrows. In the embodiment shown in FIG. 2A, the fluid enters the filtration system 100 at the first port 120. The fluid flows from the first port 120 to the standpipe 250. The standpipe 250 guides the fluid to flow towards the second endplate 220. More specifically, the fluid flows into the inner volume 206 defined by standpipe 250. The fluid is substantially prevented from flowing into the intermediate volume 204 by the seal formed by the second sealing member 280. The fluid flows from the standpipe 250 into the lower volume 208. As the fluid flow through the standpipe 250 and into the lower volume 208, one or more parameters of the fluid may change. For example, the pressure of the fluid may decrease. The lower volume is in fluid providing communication with the outer volume 202 such that the fluid flows from the lower volume 208 into the outer volume 202 by passing through a gap between the second endplate 220 and the shell 132. The fluid then flows radially inward through the filter media 230 and into the intermediate volume 204. The fluid then flows out of the intermediate volume 204, through the second opening 216 and to the second port 124. The fluid exits the filtration system 100 by flowing out of the second port 124 and to a downstream device, such as an engine.

FIG. 2B is a side sectional view showing aspects of the filtration system 100 of FIG. 1. As shown in FIG. 2B, the inner portion 224 of the second endplate 220 wraps around a circumference of the second portion 254 of the standpipe 250.

Figure 3:
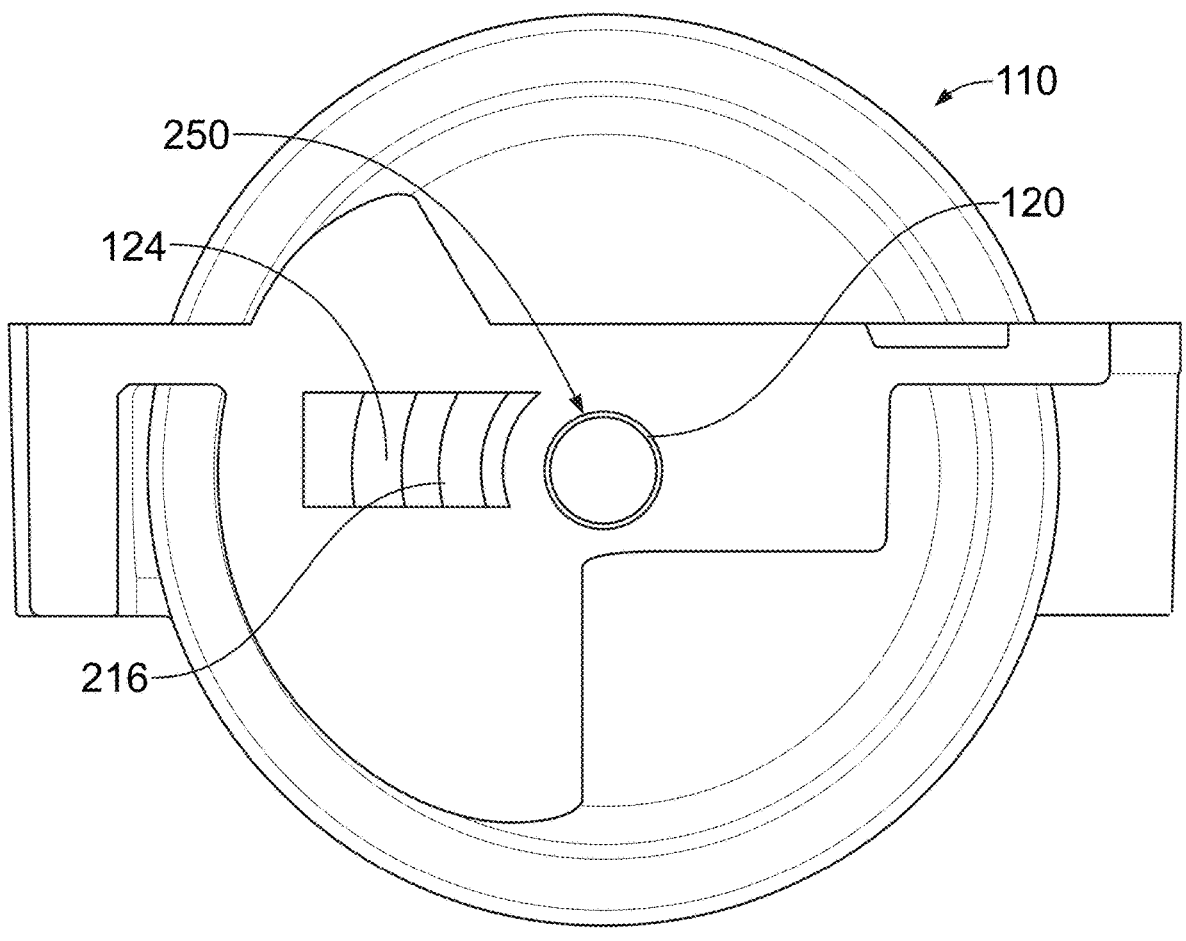
FIG. 3 is a top sectional view of the filtration system of FIG. 1.

FIG. 3 is a top sectional view of the filtration system 100 of FIG. 1. As shown, the first port 120 is axially aligned with the standpipe 250. The second port 124 is aligned with at least a portion of the second opening 216.

Figures 4A, 4B, 4C:
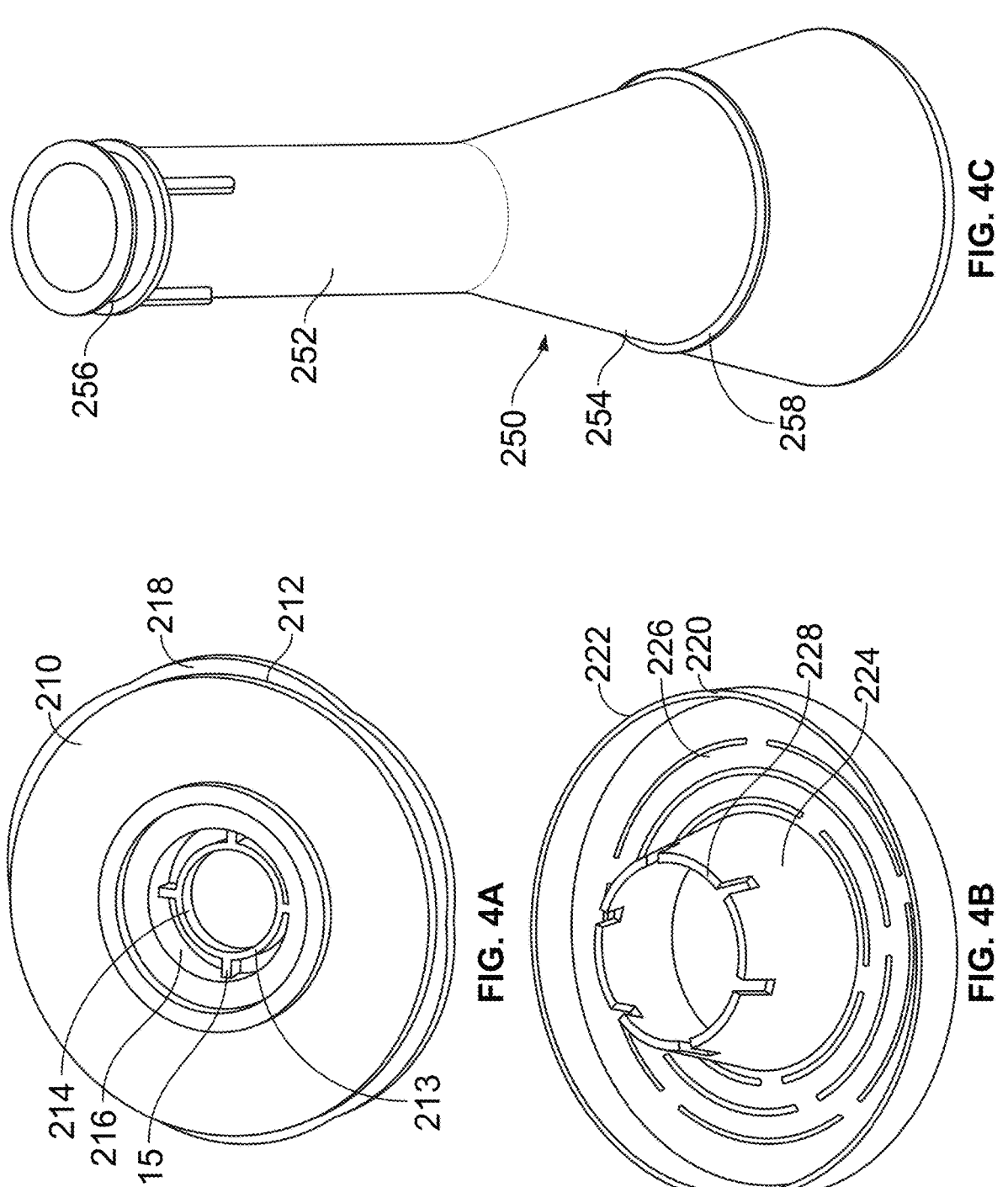
FIG. 4A is a perspective view of a first endplate of a filter cartridge for use in the filtration system of FIG. 1.
FIG. 4B is a perspective view of a second endplate of the filter cartridge for use in the filtration system of FIG. 1.
FIG. 4C is a perspective view of a standpipe of the filter cartridge for use in the filtration system of FIG. 1.

FIG. 4A is a perspective view of the first endplate 210 for the filtration system 100 of FIG. 1. As shown, the first endplate 210 includes the first endplate sealing surface 212, the first opening 214, and the second opening 216. The first endplate 210 also includes one or more ribs 215 that extends across the second opening 216 towards a circular wall 213 that defines the first opening 214. In particular, the circular wall 213 defines a boundary between the first opening 214 and the second opening 216.

The first endplate 210 also includes an interlocking interface 218 for positioning the filter element within the filter head 110 and/or the shell 132. The interlocking interface 218 extends radially away from the first endplate 210 and towards the second endplate 220. The interlocking interface 218 includes an outer wall that extends around the circumference of the first endplate 210. The outer wall includes a top surface, a bottom surface, and an outer surface. The top surface and the bottom surface are substantially parallel to each other and extend in a radial direction, away from the first endplate 210. The outer surface is substantially perpendicular to the top surface and the bottom surface. The outer surface may have an undulating or repeating pattern that matches a complementary pattern of an inner surface of the shell 132 such that the interlocking interface 218 aligns the filter element 200 within the shell 132. The interlocking interface 218 may further prevent non-authorized filter elements from being installed in the filtration system, for example, by preventing a non-matching pattern from fitting within the shell 132. Additionally, the undulating pattern of the interlocking interface 218 may prevent the filter element 200 from freely rotating with respect to the shell 132. In other embodiments, the interlocking interface 218 may be substantially circular or annular in shape. In these embodiments, the interlocking interface 218 does not prevent the filter element 200 from rotating relative to the shell 132.

In any of the above described embodiments, the interlocking interface 218 at least partially defines the first endplate sealing surface 212. The first endplate sealing surface 212 extends around a circumference of the first endplate 210, above the interlocking interface 218. As briefly described above, the first endplate sealing surface 212 may support the seal member 180.

FIG. 4B is a perspective view of a second endplate 220 for the filtration system of FIG. 1. The second endplate 220 includes the inner portion 224 having an opening 228, as described with respect to FIG. 1. In the embodiment shown in FIG. 4B, the inner portion 224 comprises a substantially conical wall. It should be understood that, in other embodiments, the inner portion 224 comprises a wall that is complimentary in shape to the second portion 254 of the standpipe 250. The second endplate 220 also includes an axial wall 222 and an end wall 226. The end wall 226 is a disc shaped wall that extends from the inner portion 224 towards the axial wall 222. The center of the disc shape of the end wall 226 at least partially defines the opening 228. The axial wall 222 extends axially away from the end wall 226. The axial wall 222, the inner portion 224, and the end wall 226 define a channel that receives the filter media 230 therein.

FIG. 4C is a perspective view of a standpipe 250 for the filtration system 100 of FIG. 1. The standpipe 250 includes the first portion 252, the second portion 254, and the standpipe sealing surface 256, as described with respect to FIG. 1. The standpipe 250 also includes a snap-fit feature 258. The snap-fit feature 258 is an annular flange that extends radially away from the second portion towards the center tube 240 and the filter media 230. The snap-fit feature 258 that enables the standpipe 250 to couple to the second endplate 220 in a snap fit arrangement. For example, when the standpipe 250 is coupled to the second endplate 220, the snap-fit feature 258 may deflect the inner portion 224 radially outward. When the snap-fit feature 258 is axially above the inner portion 224, the inner portion 224 may deflect back to the original position. The snap-fit feature 258 contacts a top surface of the inner portion 224 such that the top surface of the inner portion 224 substantially prevents the standpipe 250 from moving axially downward with respect to the second endplate 220 by contacting the snap-fit feature 258.

Figure 5:
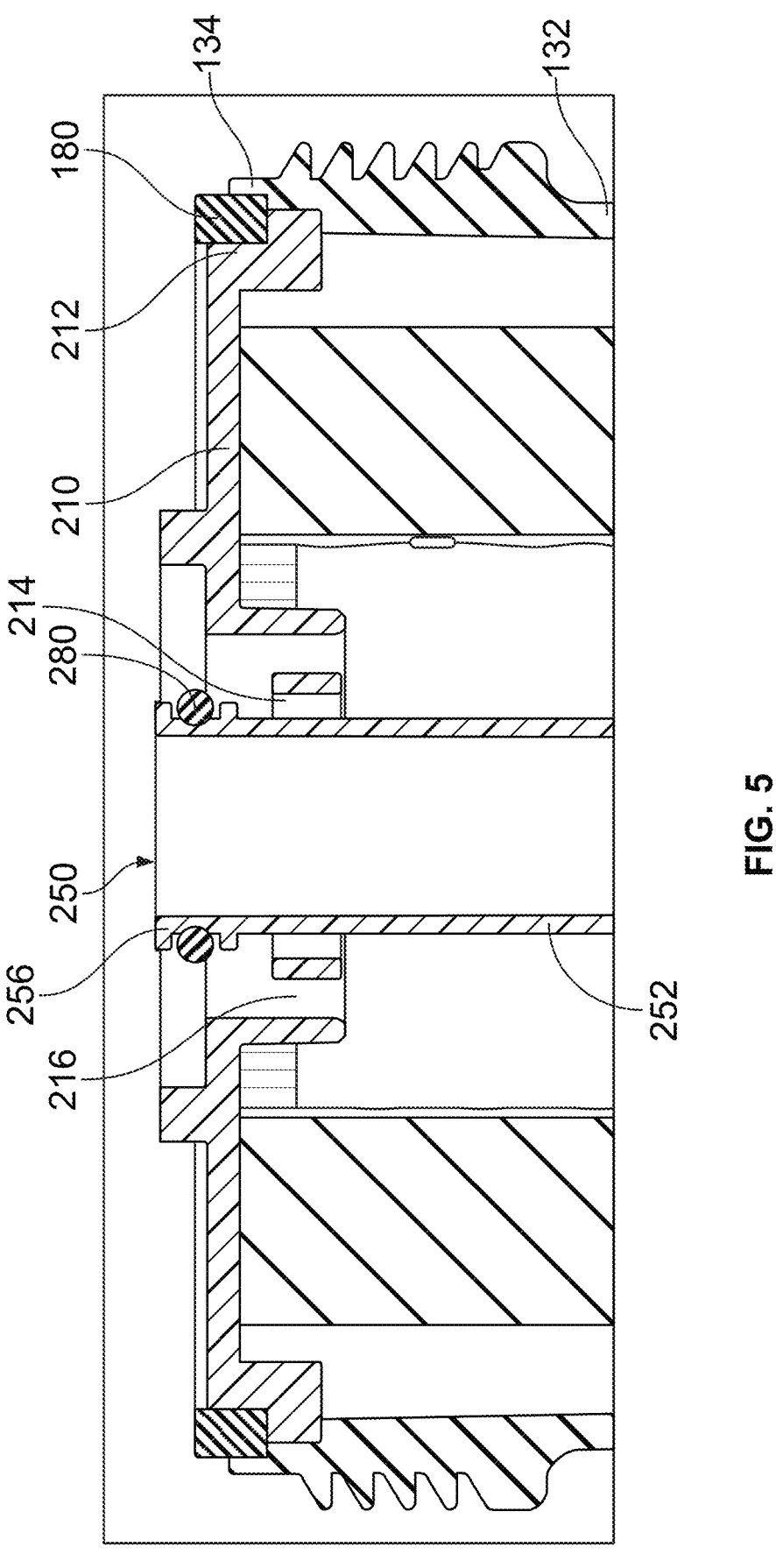
FIG. 5 is a detailed sectional view showing an upper portion of the filter cartridge for use in the filtration system of FIG. 1.

FIG. 5 is a detailed sectional view showing aspects of the filter element 200 of FIG. 1. As shown, the standpipe 250 at least partially extends through the first opening 214 of the first endplate 210. The first endplate sealing surface 212 and the shell sealing surface 134 at least partially define a cavity for the first sealing member 180. The standpipe sealing surface 256 at least partially defines a cavity for the second sealing member 280.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "approximately" and similar terms are intended to have a broad meaning in harmony with the common and accepted usage by those of ordinary skill in the art to which the subject matter of this disclosure pertains. The term "approximately" as used herein refers to ±10% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, various parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various example embodiments without departing from the scope of the concepts presented herein.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter element comprising:
a filter media, the filter media structured to filter a fluid;
a first endplate coupled to the filter media at a filter media first end;
a second endplate coupled to the filter media at a filter media second end, opposite the filter media first end; and
a standpipe positioned radially within the filter media and coupled to the second endplate, the standpipe comprising:
a first portion extending away from the first endplate in a direction towards the second endplate, an inner surface of the first portion having a cylindrical shape; and
a second portion extending away from the first portion towards the second endplate, an inner surface of the second portion having a frusto-conical shape with a radius that increases from a minimum radius at a second portion first end to a maximum radius at a second portion second end,
wherein the first endplate comprises a first opening and a second opening, the first opening positioned radially within the second opening, the first opening sized to receive at least a portion of the standpipe therein.

2. The filter element of claim 1, wherein the second endplate includes an inner portion that extends axially away from the second endplate towards the first endplate, the inner portion defining an opening that is sized to receive at least a portion of the standpipe.

3. The filter element of claim 1, wherein the first endplate further comprises a circular wall that defines a boundary between the first opening and the second opening.

4. A filter element comprising:
a filter media, the filter media structured to filter a fluid;
a first endplate coupled to the filter media at a filter media first end;
a second endplate coupled to the filter media at a filter media second end, opposite the filter media first end;
a standpipe positioned radially within the filter media and coupled to the second endplate, the standpipe comprising:
a first portion extending away from the first endplate in a direction towards the second endplate, the first portion having a cylindrical shape; and
a second portion extending away from the first portion towards the second endplate, the second portion having a radius that increases from a minimum radius at a second portion first end to a maximum radius at a second portion second end,
wherein the second endplate includes an inner portion that extends axially away from the second endplate towards the first endplate, the inner portion defining an opening that is sized to receive at least a portion of the standpipe, and
wherein the standpipe comprises an annular flange that extends radially away from the second portion of the standpipe towards the filter media, the annular flange contacting a top surface of the inner portion.

5. The filter element of claim 4, wherein the second portion is substantially conical in shape.

* * * * *